Aug. 19, 1941.    A. C. JAECKEL    2,253,333
CONVEYER
Filed Nov. 13, 1939    3 Sheets-Sheet 1

Adolph C. Jaeckel
INVENTOR.

BY
ATTORNEY.

Aug. 19, 1941.  A. C. JAECKEL  2,253,333
CONVEYER
Filed Nov. 13, 1939  3 Sheets-Sheet 2

Adolph C. Jaeckel
INVENTOR.

BY *Elvin C. Andrus*
ATTORNEY.

Aug. 19, 1941.  A. C. JAECKEL  2,253,333
CONVEYER
Filed Nov. 13, 1939  3 Sheets-Sheet 3

Adolph C. Jaeckel
INVENTOR.

BY
ATTORNEY.

Patented Aug. 19, 1941

2,253,333

UNITED STATES PATENT OFFICE 2,253,333

CONVEYER

Adolph Carl Jaeckel, Milwaukee, Wis., assignor to A. O. Smith Corporation, Milwaukee, Wis., a corporation of New York Application November 13, 1939, Serial No. 304,022

11 Claims. (Cl. 198—179)

This invention relates to a conveyer.

An object of the invention is to provide a conveyer for picking up elongated objects and conveying them to a desired position at which they are automatically released.

A more specific object of the invention is to provide a conveyer to pick up weldrods to which a suitable covering has been applied, convey them through a drying oven in which the covering is dried and hardened, and discharge them from the conveyer after passage through the oven.

A further object of the invention is to provide a conveyer of this kind which will require no adjustment or modification to handle rods of different length.

Other objects of the invention will be clear from the following detailed description and the accompanying drawings in which.

In the manufacture of covered weldrods for use in electric arc welding, it is customary to extrude or to otherwise apply a covering of suitable ingredients to the wire which forms the core of the rod. The covering can be applied to a continuous wire which is then cut into suitable lengths, or the wire may first be cut into shorter lengths to which the covering is applied. The conveyer of this invention is particularly adapted for use when the wire is cut into lengths which are twice the length of the finished weldrod. Shortly after the coating is applied and while it is still soft and easily removed, it is brushed off from a short section at the middle of the double length rod to provide a bare section for attachment to an electrode holder. The conveyer grips the rod at the bared section where it will do no injury to the soft and easily deformed covering and conveys the rod through a drying oven in which the covering is dried and hardened. The rods are then cut in two at the middle of the bared section, each double length rod thus giving two completed weldrods with one end bare for attachment to an electrode holder. It will be seen that by gripping the rods in the middle instead of at the ends, no adjustment of the conveyer is needed to handle rods of different length.

Figure 1:
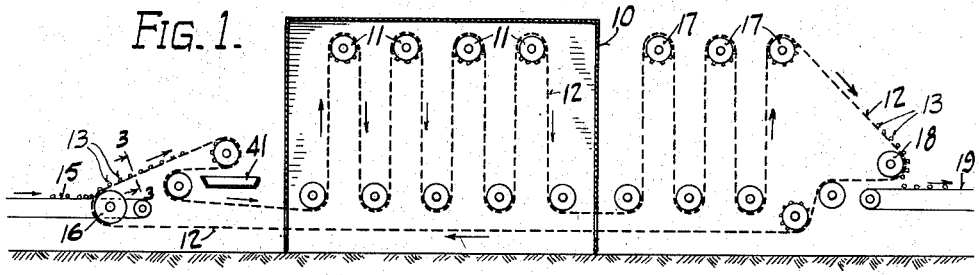
Fig. 1 is a schematic side elevation of the drying oven and the conveyer, the oven being shown in section to show the course of the conveyer through it.

Referring to the drawings, and at first to Fig. 1, a suitable drying oven 10 is provided with sprockets 11 around which the conveyer chain 12 is passed. Weldrods 13 which have had the covering applied and have then been brushed bare for a short distance 14 in the middle, are brought in from the left on conveyer belts 15 and are gripped by the chain 12 where it passes over the pulley 16. After passing through the oven the conveyer chain makes several vertical flights over the sprocket wheels 17 to give the rods time to cool. They are then discharged where the chain 12 passes over the pulley 18 and fall on the conveyer belt 19 which transports them to suitable machinery for cutting the rods in two.

Figure 4:
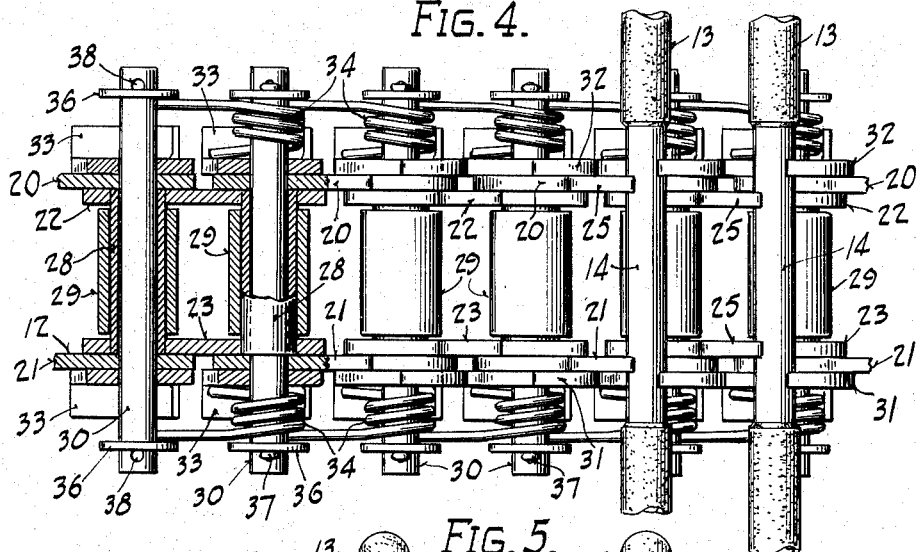
Fig. 4 is an enlarged plan view of the conveyer chain, and partly in section, the section being taken on line 4—4 of Fig. 5.
Figure 5:
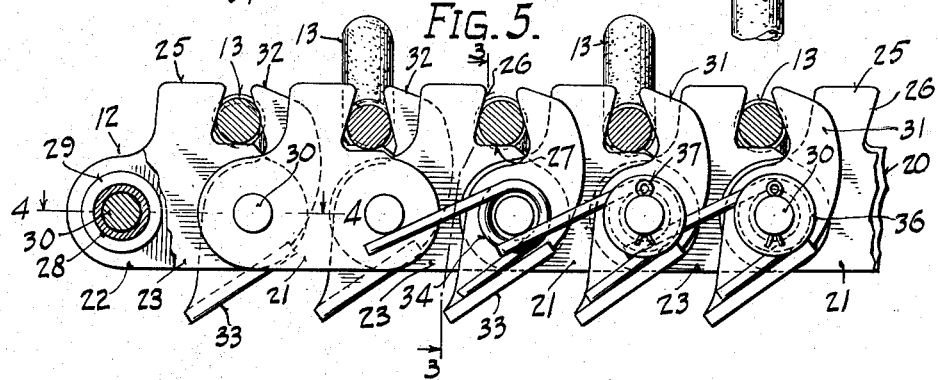
Fig. 5 is a side elevation of the conveyer chain, parts being broken away.
Figure 6:
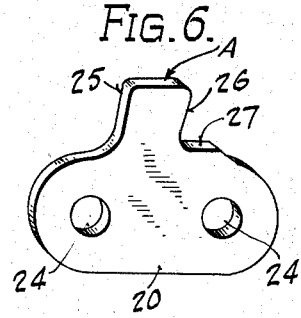
Figs. 6 and 7 are perspective views of links used in constructing the conveyer chain.
Figure 7:
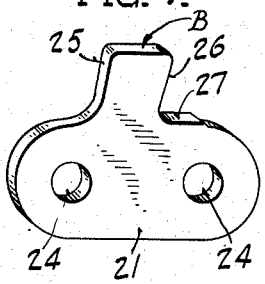
Figure 8:
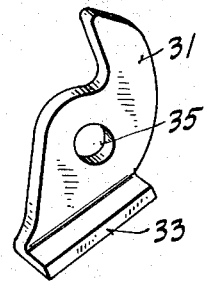
Fig. 8 is a view in perspective showing a clamp.
Figure 9:
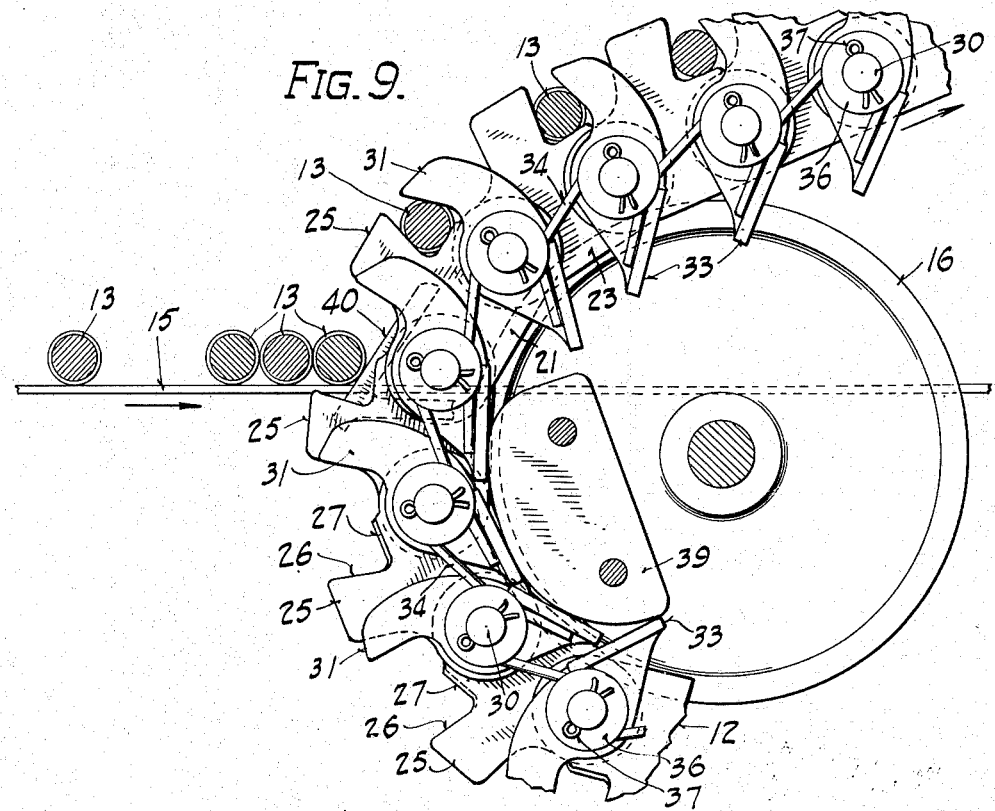
Fig. 9 is a view in elevation showing the arrangement for feeding rods to the conveyer chain.
Figure 10:
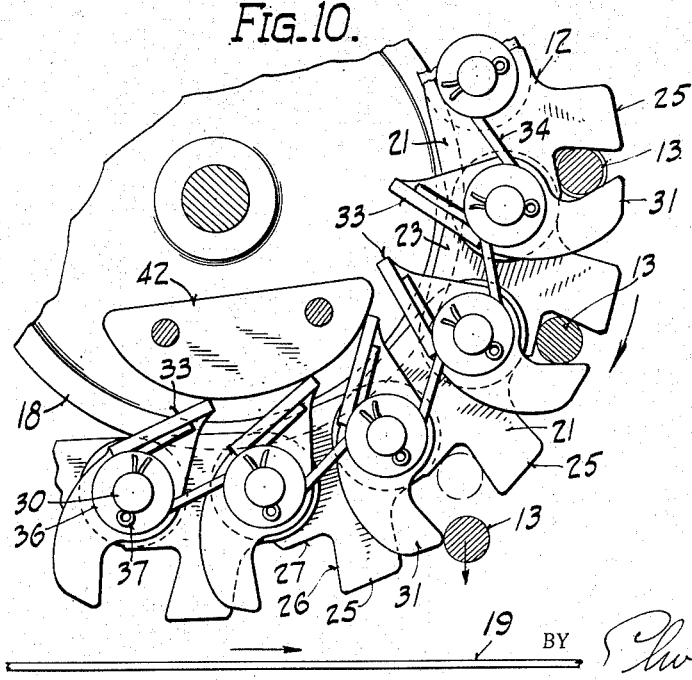
Fig. 10 is a similar view showing the arrangement for discharging rods from the chain.

The conveyer chain for gripping the weldrods and carrying them through the oven has for side members the links 20, 21, 22, and 23 of which 20 is shown in perspective in Fig. 6 and 21 in Fig. 7. These links may be stamped or otherwise formed from flat sheets of metal of suitable thickness and are of generally similar shapes. Each has two holes 24 for connection to other units of the chain, and each is provided with a projection 25 of which one surface 26 is inclined to the surface 27 of the link to form an angle in which a weldrod can be clamped. The difference between the links 20 and 21 is that in 20 the surface 27 is slightly farther from the center line of holes 24 than in link 21. Links 22 and 23 are identical with 21 and 20, respectively, except that the holes with which they are provided are somewhat larger to receive the ends of bushing 28 as is apparent from an inspection of Fig. 4. The links 20 and 23, which are alike in respect to the spacing of surface 27 from the center lines of holes 24 and which differ only in the size of the holes, are hereinafter collectively designated as links A, while links 21 and 22 are collectively designated as links B. A link A is shown in Fig. 6 and a link B in Fig. 7. The chain is so assembled that link 20 is opposite link 21. In these two links the surfaces 27 are at different distances from the center lines of the holes 24. Consequently a weldrod resting on the surfaces 27 of the two opposite links 20 and 21 will be tilted to one side of the plane of the conveyer chain. The next adjacent pair of links, 22 and 23, is arranged to tilt a weldrod carried by them to the other side of the plane of the chain. Since links 20 and 23 are similar, except for the size of the holes 24 which is immaterial in this connection, and the same is true of links 21 and 22, the links in one side of the chain will be alternately 20 and 22, and those of the other side alternately 21 and 23, with a link 20 opposite 21 and 22 opposite 23. Otherwise expressed, the links on one side of the chain are alternately A and B and those on the other side are alternately B and A, with a link A always opposite a link B. Due to the fact that the bearing surfaces 27 are at different distances from the center line of the chain for links A and B, such an arrangement will result in tilting adjacent weldrods to opposite sides of the plane of the chain. This increases the separation between the ends of adjacent weldrods and diminishes the likelihood that oscillations due to motion of the chain will cause the ends of adjacent weldrods to brush against each other with consequent damage to the coating.

In assembling the chain it is found convenient to press links 22 and 23 on bushings 28 to make a tight fit on the bushings. Rollers 29, to reduce friction with the sprockets, may advantageously be assembled on the bushings 28 before the links are forced into place. This operation results in the formation of a rectangular unit with one pair of sides formed by links 22 and 23 and the other pair of sides formed by bushings 28. A number of such units are readily assembled into a continuous length of chain by links 20 and 21 and pins 30.

Right and left hand clamps 31 and 32 are provided, one at each end of each pin to grip the weldrods and hold them in place while the chain carries them through the oven. Each clamp may be formed from sheet metal bent over at one end to provide an abutment 33 for a spring 34. The clamps are provided with holes 35 and are preferably formed of thick sheet stock to provide a sufficient bearing surface on pins 30 to insure that the clamps will rotate in a plane substantially perpendicular to the pins. A coil spring 34 mounted on the ends of pins 30, is provided for each clamp. One end of the spring bears against the abutment 33 on the clamp while the other end bears against the pin 30 of the adjacent clamp. The springs should have sufficient movement to hold the weldrods tightly gripped while the chain is running over the sprockets and pulleys which control its motion as well as when it is between them. A washer 36 is placed on each end of pin 30 outside each spring and the whole assembly is held in position by cotter pins 37 inserted through holes 38 near the ends of each pin.

Stationary cams 39 are provided at the pulley 16 where the weldrods are transferred from the conveyer belts 15 to the conveyer chain 12. The motion of the chain 12 brings the abutments 33 of the clamps into contact with the cams. These force the clamps to open against the tension of the springs 34. As the openings in the chain are carried upward by the motion of the chain, a weldrod is fed into each opening by conveyer belts 15. The rods are carried upward with the chain and are gripped and held in place by the clamps which are closed by the springs 34 as soon as the abutments 33 leave the cams 39. It will be seen that the rods are gripped by the conveyer chain at their centers where the covering has been stripped off for reasons previously described. As a consequence there is no damage to the coating which is initially somewhat soft and fragile and which could not be securely gripped between metallic members without danger of deformation.

Figure 2:
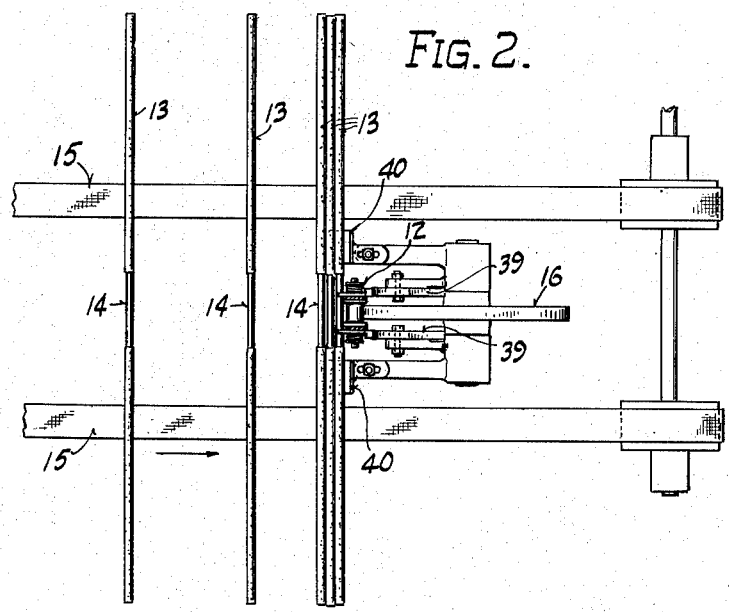
Fig. 2 is a plan view of the left hand end of Fig. 1.
Figure 3:
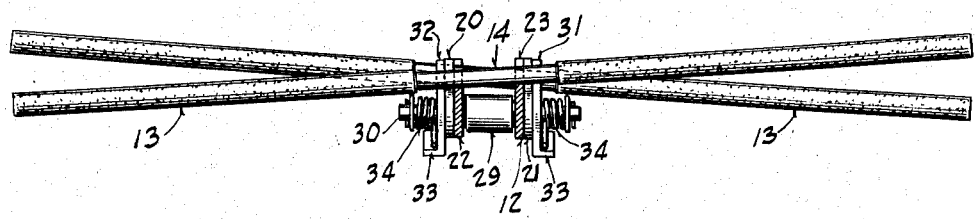
Fig. 3 is an enlarged view of the conveyer partly in elevation and partly in section, the section being taken on line 3—3 of Figs. 1 and 5.

It has been found that no damage to the coating is caused by allowing the belts 15 to crowd the weldrods up to the chain 12 as indicated in Fig. 2. As a consequence it is not necessary to synchronize the motion of the chain 12 with that of the belts 15 or with the machinery which applies the coating to the rods and brushes it off the short section at the middle. Each link of the chain simply picks up the nearest rod as the chain passes around the pulley 16. When large rods are being made the limited dimensions of the openings in the chain will prevent more than one rod from being picked up at a time. When the rods are of such small diameter that two or more might find room in one opening of the chain, stops 40 are provided to limit the motion of the rods towards the chain and insure that no more than one rod is picked up by each unit of the chain. Any rods which are carried upward by the chain 12 but which, for one reason or another, are not securely gripped by the clamps, fall into tray 41 before being carried into the oven.

The arrangement adopted for releasing rods from the chain is generally similar to that used for picking them up. Stationary cams 42 are provided to bear against abutments 33 where the chain passes around pulley 18. These cams open the clamps against the spring tension and drop the weldrods upon conveyer belt 19 for transport to subsequent operations.

It will be understood that the chain and other parts of the conveyer are to be made of materials resistant to whatever corrosive influences may exist in the oven, or are to be suitably treated over their surfaces so as to be corrosion resistant.

The conveyer chain and belts are driven by means which are well known to the art and are not shown in the drawings since they form no part of this invention.

I claim:

1. A conveyer chain for the transport of elongated articles held to the chain near the midpoints of their lengths, the chain comprising a plurality of cross pins connecting a plurality of side links of each of two kinds, A and B, the links A and B having bearing surfaces for contact with an elongated article disposed at different distances from the line joining the centers of two adjacent pins, and the side links being arranged in the chain with a link A opposite a link B and with adjacent links on the same side of the chain alternately A and B, the chain being adapted to tilt an elongated article bearing on one pair of opposite links to one side of the plane defined by the center lines of the pins which connect the links, and to tilt an elongated article bearing on the next adjacent pair of links to the opposite side of such a plane.

2. In combination, a conveyer chain for the transport of elongated articles comprising a plurality of cross pins connecting a plurality of side links of each of two kinds, A and B, the links A and B having bearing surfaces for contact with an elongated article disposed at different distances from the line joining the centers of two adjacent pins and being arranged in the chain with a link A opposite a link B and with adjacent links on the same side of the chain alternately A and B; a clamp rotatable about the axis of a cross pin and adapted to hold an article in contact with a pair of opposite links; and a spring to hold the clamp in a normally closed position.

3. In combination, a conveyer chain for the transport of elongated articles comprising a plurality of cross pins connecting a plurality of side links of each of two kinds, A and B, the links A and B having bearing surfaces for contact with an elongated article disposed at different distances from the line joining the centers of two adjacent pins and being arranged in the chain with a link A opposite a link B and with adjacent links on the same side of the chain alternately A and B; a clamp rotatable about the axis of a cross pin and disposed between one end of the pin and the side link of the chain which is nearest said end of the pin; a second clamp similarly disposed at the other end of the same pin; and springs to hold said clamps in normally closed positions.

4. In combination, a conveyer chain for the transport of elongated articles comprising a plurality of cross pins connecting a plurality of side links of each of two kinds, A and B, the links A and B having bearing surfaces for contact with an elongated article disposed at different distances from the line joining the centers of two adjacent pins and being arranged in the chain with a link A opposite a link B and with adjacent links on the same side of the chain alternately A and B; a clamp rotatable about the axis of a cross pin and adapted to hold an article in contact with a pair of opposite links; a spring to hold the clamp in a normally closed position; means disposed at a desired position along the travel of the chain to open the clamp for the reception of an article to be gripped by it; and means disposed at another position along the travel of the chain to open the clamp and release the article held by it.

5. In combination, a conveyer chain for the transport of elongated articles comprising a plurality of cross pins connecting a plurality of side links of each of two kinds, A and B, the links A and B having bearing surfaces for contact with an elongated article disposed at different distances from the line joining the centers of two adjacent pins and being arranged in the chain with a link A opposite a link B and with adjacent links on the same side of the chain alternately A and B; a clamp rotatable about the axis of a cross pin and disposed between one end of the pin and the side link of the chain which is nearest said end of the pin; a second clamp similarly disposed at the other end of the same pin; springs to hold said clamps in a normally closed position; means disposed at a desired position of articles to be gripped by them; and means disposed at another position along the travel of the chain to open the clamps and release articles held by them.

6. In combination, a conveyer chain for the transport of elongated articles comprising a plurality of cross pins connecting a plurality of side links of each of two kinds, A and B, the links A and B having bearing surfaces for contact with an elongated article disposed at different distances from the line joining the centers of two adjacent pins and being arranged in the chain with a link A opposite a link B and with adjacent links on the same side of the chain alternately A and B; a clamp rotatable about the axis of a cross pin and adapted to hold an article in contact with a pair of opposite links; a spring to hold the clamp in a normally closed position; a pulley around a portion of which the chain is passed; and a stationary cam adjacent the pulley adapted to bear against a clamp as the motion of the chain carries the clamp over the cam, the contact between the cam and the clamp forcing the clamp open against the spring pressure which normally holds it closed.

7. In combination, a conveyer chain for the transport of elongated articles comprising a plurality of cross pins connecting a plurality of side links of each of two kinds, A and B, the links A and B having bearing surfaces for contact with an elongated article disposed at different distances from the line joining the centers of two adjacent pins and being arranged in the chain with a link A opposite a link B and with adjacent links on the same side of the chain alternately A and B; a clamp rotatable about the axis of a cross pin and disposed between one end of the pin and the side link of the chain which is nearest said end of the pin; a second clamp similarly disposed at the other end of the same pin; springs to hold the clamps in a normally closed position; a pulley around a portion of which the chain is passed; and stationary cams adjacent the pulley adapted to bear against the clamps as the motion of the chain carries them over the cam, the contact between the cams and the clamps forcing the clamps to open against the spring pressure which normally keeps them closed.

8. In a conveyer system for the transport of elongated articles of relatively small lateral dimensions, the combination of an endless conveyer chain, means for gripping and holding elongated articles near the mid points of their length, the gripping and holding means being disposed to tilt adjacent elongated articles in a fully loaded chain in opposite directions transverse to the conveyer chain, means for opening the gripping means to permit reception of the elongated articles, and means for opening the gripping means to release the elongated articles.

9. In a conveyer system for the transport of elongated articles of relatively small lateral dimensions, the combination of a conveyer chain, spring operated means held in a normally closed position for gripping and holding elongated articles near their mid points, said gripping and holding means being disposed to tilt adjacent elongated articles in a fully loaded chain in opposite directions transverse to the conveyer chain, means for opening said gripping means against spring pressure to permit reception of the elongated articles, and means for opening the gripping means against spring pressure to release the elongated articles.

10. In a conveyer system, a conveyer chain, a clamp carried by the chain adapted to grip an elongated article of relatively small lateral dimensions near the mid point of its length and hold it tilted to one side of the conveyer chain, an adjacent clamp carried by the chain adapted to grip an elongated article near the mid point of its length and hold it tilted to the other side of the chain, springs to hold the clamps in normally closed position, means to open the clamps against the springs for the reception of articles to be conveyed by the chain, and means to open the clamps against the springs to release the articles held by them.

11. In a conveyer system, a conveyer chain, a clamp carried by the chain adapted to grip an elongated article of relatively small lateral dimensions near the mid point of its length and hold it tilted to one side of the conveyer chain, and an adjacent clamp carried by the chain adapted to grip an elongated article near the mid point of its length and hold it tilted to the other side of the chain.

ADOLPH C. JAECKEL.